UNITED STATES PATENT OFFICE.

ALBRECHT SCHMIDT AND ERNST BRYK, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

VAT DYE AND PROCESS OF MAKING SAME.

947,030.     Specification of Letters Patent.     Patented Jan. 18, 1910.

No Drawing.     Application filed August 14, 1909. Serial No. 512,810.

*To all whom it may concern:*

Be it known that we, ALBRECHT SCHMIDT, Ph. D., and ERNST BRYK, Ph. D., citizens of the Empires of Germany and Austria-Hungary, respectively, residing at Höchst-on-the-Main, Germany, have invented certain new and useful Improvements in the Manufacture of Vat Dyestuffs, of which the following is a specification.

In French Patent No. 399,645 is described a process, according to which, by the action of concentrated nitric acid on thio-indigo, its homologues and halogen-substitution-products no nitro-derivatives but oxidation-products are obtained, which are soluble in alkali lyes. Contrary to this statement we have made the surprising observation that by subjecting the said thioindigo dyestuffs to nitration in absence of water, nitro-derivatives of the thioindigo-series can be produced which are valuable vat-dyestuffs and which dye on the vegetable as well as on the animal fiber, in the hydrosulfite vat, violet, grayish-violet to blackish tints, the nitro-groups being reduced in the vat.

Instead of reducing the nitro-group in the vat, the nitration products obtained may be treated with reducing agents, for instance with $Na_2S$, $Na_2S_2$, zinc and the like, by which the nitro-group is converted into the amino-group, and the amino-bodies isolated as such. These amino-bodies are also valuable vat-dyestuffs which dye on the fiber violet, grayish-violet to blackish tints. Moreover the above mentioned nitro- as well as amino-products are capable of being halogenized and in this case they can be transformed into fast and useful vat-dyestuffs of similar properties.

The following examples illustrate the process above referred to, but the conditions under which the tests are made may be varied.

Example I: 15 gr. of thioindigo are dissolved in 150 gr. of sulfuric acid monohydrate; this solution is heated and then 12 gr. of potassium nitrate are gradually added whereby the temperature rises to about 80°. During this operation the green color first turns blue and finally violet-red. The mass is stirred for some time, poured on ice, filtered and washed with hot water and a diluted solution of sodium carbonate; in this manner the nitrated thioindigo is obtained.

The dyestuff thus produced forms a dry, dark powder which is insoluble in water, diluted alkalies and acids, ligroin, alcohol and ether; soluble in concentrated sulfuric acid with a greenish-blue color; and which dyes, on reduction of the nitro-group to the amino-group in the alkaline hydrosulfite-vat, cotton and wool violet-gray to gray tints. By using instead of the thioindigo, para-para-dichloro-ortho-ortho-dimethyl-thioindigo ($S:Cl:CH_3 = 1:4:6$), a dyestuff is obtained which dyes cotton in the hydrosulfite vat violet tints, whereas, by starting from the para-para-dichloro-thio-indigo ($S:Cl = 1:4$) a dyestuff is produced, which draws on the fiber also with a violet tint. By halogenizing the nitrated thioindigo-dyestuffs thus obtained by means of bromin, chlorin or one of the known halogen-yielding substances, vat-dyestuffs are produced which are much faster and which possess properties resembling those of the non-halogenized products.

Example II: 20 gr. of the nitrated thio-indigo dyestuffs, obtained from thioindigo, para-para-dichloro-ortho-ortho-dimethyl-thioindigo ($S:Cl:CH_3 = 1:4:6$), or para-para-dichloro-thioindigo ($S:Cl = 1:4$) according to example I, are reduced by means of a solution of about 10 gr. of crystallized sodium sulfid in about 70 ccm. of water at about 80°, filtered and extracted with boiling water. The resulting products, when dry, form dark powders which dissolve in sulfuric acid monohydrate with a greenish color and dye wool and cotton violet, gray to grayish-black tints, that is to say, the reduction-product of the: nitrated thioindigo dyes gray to grayish-black tints; that of the para-para-dichloro-ortho-ortho-dimethylthioindigo ($S:Cl:CH_3 = 1:4:6$) (a violet powder insoluble in water, diluted alkalies and acids, ligroin, alcohol and ether) dyes violet tints; that of the para-para-dichlorothioindigos ($S:Cl := 1:4$) dyes violet hues. These reduced nitrothioindigo-dyestuffs also are capable of being halogenized by means of bromin, chlorin or one of the known halogen yielding substances, whereby vat-dyestuffs of greater fastness are obtained.

Having now described our invention, what we claim is:

1. The process of manufacturing vat-dyestuffs, which consists in nitrating thioindigo, its homologues and substitution-products, in absence of water.

2. The process of manufacturing vat-dyestuffs, which consists in nitrating thioindigo, its homologues and substitution - products, and reducing the products thus obtained.

3. The process of manufacturing vat-dyestuffs, which consists in nitrating thioindigo, its homologues and substitution products, and treating the products thus obtained with halogen or halogen-yielding substances.

4. As new products, the thioindigo dyestuffs obtainable by nitrating thioindigo, its homologues and substitution - products and their products reduced to amino-bodies, being violet to dark powders; insoluble in water, diluted alkalies and acids, ligroin, alcohol and ether; soluble in concentrated sulfuric acid with a greenish to greenish-blue color; yielding when treated with alkaline reducing agents, such as hydrosulfite, a vat from which cotton and wool are dyed violet grayish to blackish tints.

5. As a new product, the nitrated and subsequently reduced para-para-dichloro-ortho-ortho - dimethylthioindigo, being a violet powder; insoluble in water, diluted alkalies and acids, ligroin, alcohol and ether; soluble in concentrated sulfuric acid with a green color; yielding when treated with alkaline reducing agents, such as hydrosulfite, a vat from which cotton and wool are dyed violet tints.

In testimony whereof, we affix our signatures in presence of two witnesses.

ALBRECHT SCHMIDT.
ERNST BRYK.

Witnesses:
  JEAN GRUND,
  CARL GRUND.